United States Patent [19]

Quay et al.

[11] Patent Number: 4,892,920
[45] Date of Patent: Jan. 9, 1990

[54] PROCESS FOR THE PREPARATION OF CYCLOHEXANEDIISOCYANATE CONTAINING POLYISOCYANATE PREPOLYMERS AND POLYURETHANES HAVING HIGH TEMPERATURE PERFORMANCE

[75] Inventors: Jeffrey R. Quay, Kutztown; Jeremiah P. Casey, Emmaus, both of Pa.

[73] Assignee: Air Products and Chemicals, Inc., Allentown, Pa.

[21] Appl. No.: 274,539

[22] Filed: Nov. 21, 1988

[51] Int. Cl.[4] .............................................. C08G 18/10
[52] U.S. Cl. ........................................ 528/61; 528/64; 528/76; 528/83
[58] Field of Search ........................ 528/61, 64, 76, 83

[56] References Cited

U.S. PATENT DOCUMENTS

| 3,651,118 | 3/1972 | Cenker et al. | 260/453 |
| 4,256,869 | 3/1981 | Schulze et al. | 528/67 |
| 4,487,910 | 12/1984 | Bauriedel | 528/65 |
| 4,487,913 | 12/1984 | Chung | 528/83 |
| 4,518,740 | 5/1985 | Disteldorf et al. | 524/783 |
| 4,603,189 | 7/1986 | Knofel et al. | 528/67 |

OTHER PUBLICATIONS

Syed, E. A.; Gorman, S. B., "A New Generation of Cast Elastomers", Oct. 29, 1985.
Dieter, J. W., Byrne, C. A., "Aliphatic Polyurethane Elastomers with High Performance Properties," Polymer Engineering and Science, May, 1987, vol. 27, No. 9, p. 673.
Wong, et al., "Reactivity Studies and Cast Elastomers Based on Transcyclohexane 1,4-Diisocyanate and 1,4 Phenylene Diisocyanate," pp. 75-92.

Primary Examiner—Maurice J. Welsh
Attorney, Agent, or Firm—Russell L. Brewer; James C. Simmons; William F. Marsh

[57] ABSTRACT

This invention relates to a polyisocyanate prepolymer for polyurethane and polyurethane/urea elastomer synthesis and to the resulting elastomer. The prepolymer is formed by reacting a cyclohexanediisocyanate with a long chain polyol under conditions such that essentially a 2:1 adduct is formed. Excess cyclohexanediisocyanate is removed prior to forming the elastomer.

12 Claims, 2 Drawing Sheets

PROCESS FOR THE PREPARATION OF CYCLOHEXANEDIISOCYANATE CONTAINING POLYISOCYANATE PREPOLYMERS AND POLYURETHANES HAVING HIGH TEMPERATURE PERFORMANCE

TECHNICAL FIELD

This invention relates to polyisocyanate prepolymers for use in preparing polyurethane and polyurethane/urea elastomers and to the resulting elastomers prepared from the prepolymers.

BACKGROUND OF THE INVENTION

The preparation of polyurethanes and polyurethane/urea elastomers by reacting an aliphatic diisocyanate with a polyol and then chain extending with a short chain diol or diamine, e.g., an aromatic diamine to form the elastomer is well known. Two processes are used, namely, the prepolymer process and the one shot process which includes reaction injection molding (RIM). A reactant system widely used in the prepolymer process utilizes a cyclohexanediisocyanate as the isocyanate component of the prepolymer and polytetramethylene glycol and polyethylene adipate glycol as the polyol component. (Such a system is sold under the trademark Elate by AKZO N.V. Then, the prepolymer is contacted with an aliphatic diol chain extender and the formulation molded.

The prepolymers using cyclohexanediisocyanates especially trans-1,4-cyclohexanediisocyanate as the isocyanate component have suffered because cyclohexanediisocyanates are volatile and toxic thus requiring special handling procedures. The prepolymers containing unreacted trans-1,4-cyclohexanediisocyanate are difficult to process because of their high melting points and high viscosities at ambient temperatures.

The prior art has produced a variety of prepolymer systems from aliphatic diisocyanates (e.g., cyclohexanediisocyanates and long chain polyols) and such prior art then includes the following patents and articles:

U.S. Pat. No. 3,651,118 discloses a process for the preparation of 1,3-cyclohexylene diisocyanates wherein the corresponding cyclohexanediamines are contacted with hydrogen chloride to form the dihydrochloride salt with subsequent reaction with phosgene to produce the diisocyanate. At column 3, the patentees indicate that the diisocyanates are useful for a variety of applications, and particularly in the preparation of polyurethanes, polyureas, and polyurethane/ureas.

U.S. Pat. No. 4,603,189 discloses various araliphatic polyisocyanates which are triisocyanates. The isocyanates are suited for producing polyurethane lacquers and are alleged to have increased resistance to yellowing in comparison to aromatic polyisocyanates and increased reactivity and hence shorter drying times than lacquers based on aliphatic polyisocyanates. These triisocyanates are methylene-bridged phenyl-cyclohexyl triisocyanates where the phenyl ring has two isocyanate groups. An example is diisocyanato-methylbenzyl-cyclohexylisocyanate.

U.S. Pat. No. 4,518,740 discloses moisture hardening varnishes having an isocyanate resin base of adducts of a mixture of diisocyanates, e.g., 2-methyl-1,5-diisocyanatopentane and 2-ethyl-1,4-diisocyanatobutane. In the background portion of the patent the patentees point out that cyclic polyisocyanates such as isophorone diisocyanate and methylene-bis-(4-cyclohexylisocyanate) are widely used for preparing polyurethanes, but the isocyanurate and the propanetriol prepolymers form hard brittle films following moisture hardening. When cyclic polyisocyanates are reacted with higher molecular weight polyols, hard or soft films can be produced, but the resulting resins are inactive and must be activated with tin catalysts, etc.

U.S. Pat. No. 4,487,913 discloses a polyester polyurethane prepared by reacting trans-1,4-cyclohexanediisocyanate with a mixed polyester polyol. The resulting polyurethane can also contain small amounts of epoxies or a carbodiimide. In the background portion of the invention, the patentee indicates that methylene-bis-(4-isocyanatocyclohexane) sold under the trademark DESMODUR W ™ by Mobay Chemical Company was suited for producing polyurethanes but had poor fuel resistance even though hydrolytic resistance was acceptable.

U.S. Pat. No. 4,487,910 discloses a process for producing polyurethane prepolymers based on monocyclic and dicyclic aromatic and aliphatic diisocyanates wherein the prepolymer has reduced residual monomer content. Various polyisocyanates such as toluenediisocyanate or methylene-bis(phenylisocyanate) and 4,4'-dicyclohexyl-methane diisocyanates are used in preparing the prepolymer.

U.S. Pat. No. 4,256,869 discloses the preparation of polyurethanes from trans-cyclohexane-1,4-diisocyanate wherein the trans-isomer content is at least 90% of the isocyanate content. It was reported in the background of the invention that processes for producing polyurethanes through the use of cyclohexanediisocyanates via a reaction with polyether and polyester polyols were known, but that these resulting polyurethane systems did not exhibit advantageous properties. However, advantages were achieved through the use of the trans-isomer of cyclohexane-1,4-diisocyanate. For example, polyurethanes produced using the trans-isomer of cyclohexane-1,4-diisocyanate had high softening temperatures with low freezing and glass transition temperatures and that they exhibited a remarkable degree of hardness and abrasion resistance over a wide temperature range.

A series of articles, e.g., Syed, et al., "A New Generation of Cast Elastomers," presented at the Polyurethane Manufacturer's Association Fall Meeting-Boston (Oct. 29, 1985), Dieter, et al., "Aliphatic Polyurethane Elastomers with High Performance Properties", Polymer Engineering and Science, mid-May-1987, Volume 27, Number 9 (page 673) and Wong, et al. Reactivity Studies and Cast Elastomers Based on trans-Cyclohexane-1,4-Diisocyanate and 1,4-Phenylene Diisocyanate, pages 75–92 disclose the preparation of polyurethane elastomers based upon the trans-isomer of cyclohexane-1,4-diisocyanate and indicate that the diol polyurethanes result in tough elastomers with excellent high temperature properties in a high moisture environment and under extreme dynamic stress.

SUMMARY OF THE INVENTION

This invention relates to a process for producing polyurethane/polyurea elastomers and to the elastomers themselves utilizing a cyclohexanediisocyanate (CHDI) based prepolymer free of unreacted cyclohexanediisocyanate and essentially free of oligomeric cyclohexanediisocyanate by-products. The prepolymer is prepared by reacting a cyclohexanediisocyanate with a long chain diol at least 90% by weight where the mole ratio of cyclohexanediisocyanate to polyol is in the range of at least 6 to 20:1 and preferably in the range of from 10 to 16:1 with reaction temperatures ranging from 40 to about 100° C, typically, 65-80° C. After formation of the prepolymer, the unreacted cyclohexanediisocyanate is removed from the prepolymer to produce a cyclohexanediisocyanate-free prepolymer, e.g., less than 0.15% by weight. The elastomer is then made by reacting the resultant prepolymer with a diol or diamine chain extender.

Significant advantages associated with the prepolymer of this invention and the process for producing such prepolymers are:

an ability to produce CHDI prepolymers which are low melting and have lower vicosities than conventional CHDI prepolymers;

a prepolymer system capable of producing elastomers having outstanding high temperature physical properties including high hardness and stiffness, a prepolymer which can be used for producing an elastomer having excellent stability to light and to hydrolysis;

an ability to produce polyurethane elastomers having excellent modulus, tensile and shear storage modulus; and a relatively straightforward process utilizing conventional processing equipment and techniques.

DRAWINGS

FIGS. 1 and 2 are plots of dynamic mechanical analysis for the prepolymers.

DETAILED DESCRIPTION OF THE INVENTION

Figure 1:
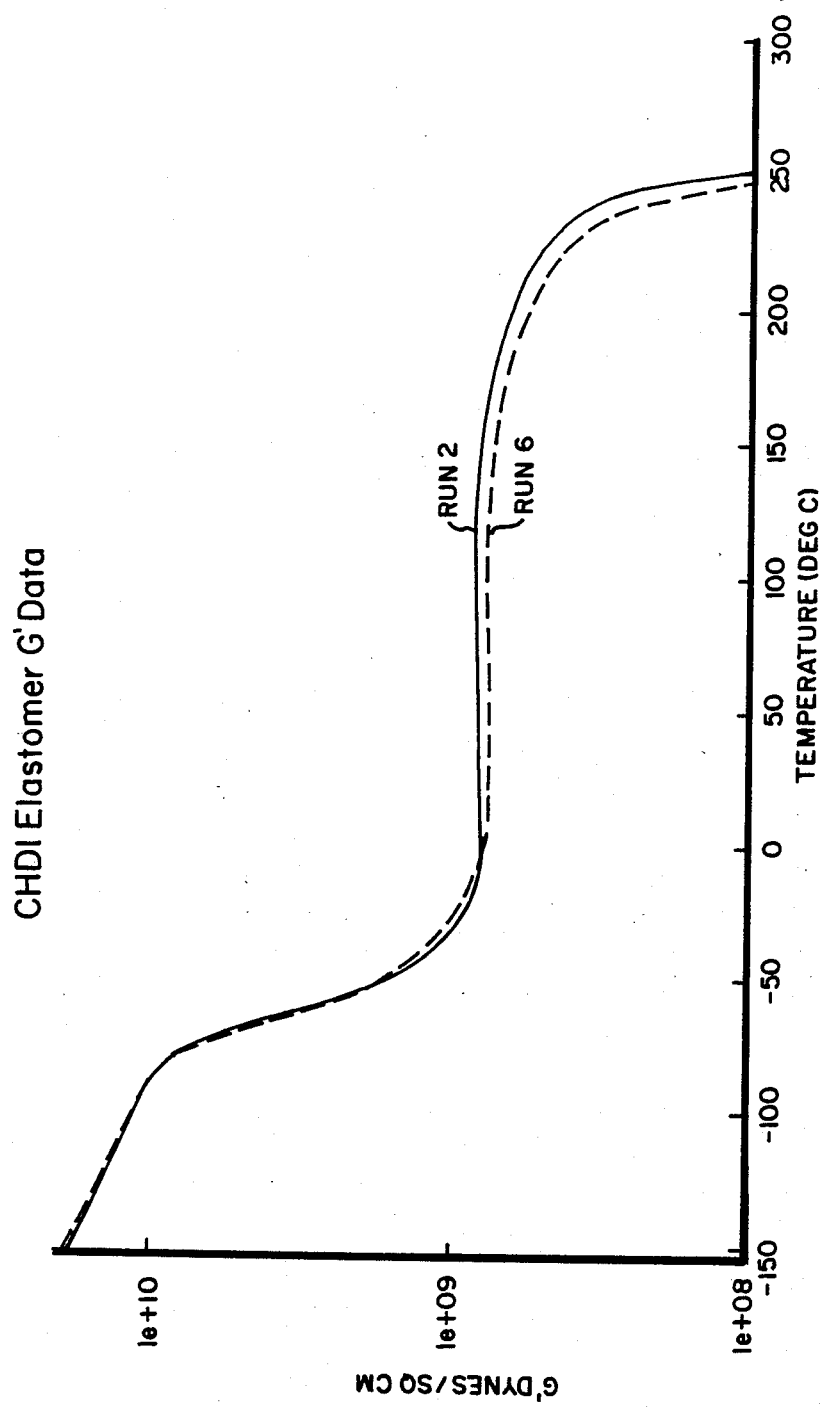

The prepolymers suited for preparing the polyurethane and polyurethane/urea elastomers of this invention are prepared by reacting cyclohexanediisocyanate with a long chain diol in such a way to minimize by-product formation and thereby produce a prepolymer which is essentially "perfect" in terms of stoichiometric cyclohexanediisocyanate to polyol ratio. The prepolymer includes a reaction product in which at least 80% by weight of the prepolymer is a prepolymer of 2 moles cyclohexanediisocyanate per mole of long chain diol.

Polyether and polyester long chain diols are normally used in the preparation of polyurethane elastomers. The hydroxyl-terminated polyethers are typically polyalkylene ether glycols such as poly(ethylene ether) glycol, poly(propylene ether) glycol and poly(tetramethylene ether) glycol. Other polyethers are prepared by the copolymerization of cyclic ethers such as ethylene oxide, and propylene oxide with various aliphatic diols such as ethylene glycol, butanediols, e.g. 1,3- and 1,4- butanediols and the like. Polyester diols can also be used for producing the polyurethane elastomers and these would include hydroxyl-terminated polyesters such as the glycols of polyethylene adipate, polypropylene adipate, polyhexamethylene adipate and copolyesters prepared by copolymerizing ethylene glycol and propylene glycol with the above polyesters which include poly(1,4-butylene-ethylene) adipate and poly(1,4-butylene-propylene) adipate.

The above polyether and polyester diols are conventional for producing polyurethane elastomers and typically they have a molecular weight range of from about 250 to 4,000 and typically from 250 to about 3,000.

Cyclohexanediisocyanate is formed by the phosgenation of a cyclohexanediamine. The cyclohexanediisocyanate can also be substituted with one or more $C_{1-4}$ alkyl groups, e.g., methylcyclohexanediisocyanates, dimethylcyclohexyldiisocyanates and so forth. Typically, the isocyanate groups are in the 1-4 position and of trans-configuration for obtaining best results. Cis-1,4-isomers may also be used. The isocyanate groups may also be 1,3- to each other in the trans form. Examples of suitable cyclohexanediisocyanates include trans-1,4-cyclohexane diisocyanate; 1,3 cyclohexanediisocyanate; 2-methyl-1,4-cyclohexanediisocyanate; 4-methyl-1,3-cyclohexanediisocyanate; 2-methyl-1,3-cyclohexanediisocyanate; 2,5-dimethyl-1,4-cyclohexanediisocyanatel 2,3,5,6-tetramethyl-1,4-cyclohexanediisocyanate; 4,5-dimethyl-1,3-cyclohexanediisocyanate; 1-methyl-3-tert-butyl-2,6-cyclohexanediisocyanate and 1-methyl-5-tert-butyl-2,4-cyclohexanediisocyanate.

In the practice of this invention considerable ingenuity is exercised in forming the prepolymer which is subsequently reacted with chain extender to produce elastomers having high temperature performance properties. First, in the prepolymer synthesis using an unsubstituted cyclohexanediisocyanate, it is important to maintain a high mole ratio of cyclohexanediisocyanate to polymeric diol, e.g. a range from about 6 to 20:1 polyol. As the level of cyclohexanediisocyanate to polyol approaches 6:1 greater quantities of oligomers in the form of cyclohexanediisocyanate by-products are formed which detract from the performance characteristics of the polyurethane elastomer system. Preferably, the mole ratio of cyclohexanediisocyanate to polyol in the reaction is from 10 to 16:1 moles of cyclohexanediisocyanate, e.g., trans-1,4-cyclohexanediisocyanate to polyol to produce oligomers at less than 20% by weight and preferably less than 10% by weight.

Examples of diol chain extenders include ethylene glycol, butanediol, hexane diol, and cyclohexanedimethanol. Polyurethane and polyurethane/urea elastomers are prepared by reacting the prepolymer with a chain extender, suitably a short chain diol or a diamine. Examples of diamine chain extenders include 4,4'-methylene-bis(o-chloroaniline), 4,4'-methylene-bis-(aniline), diethyltoluenediamine, 5-tert-butyl-2,4- and 3-tert-butyl-2,6-toluenediamine, 5-tert-amyl-2,4- and 3-tert-amyl-2,6-toluenediamine and chlorotoluenediamine. Examples of aliphatic and cycloaliphatic diamine chain extenders include 1,4-cyclohexanediamine; methylene-bis(-cyclohexylamine) and 3,3'-ditertiary-butyl-methylene-di(cyclohexylamine).

The prepolymers from which the polyurethanes are prepared should have a reacted isocyante content substantially that of stoichiometric, i.e., a mole ratio of cyclohexanediisocyanate to diol of 2:1. This objective is achieved by maintaining a high isocyanate to diol molar ratio at moderate temperatures. Maintaining a high mole ratio of feed cyclohexanediisocyanate to diol is extremely important because when the mole ratio of cyclohexanediisocyanate to diol is at slightly above stoichiometric, e.g., 10% excess, which is conventional, substantial amounts of oligomers are formed. Higher oligomer formation results in a lower isocyanate levels in the prepolymer. A lower level of reactive isocyanate in the prepolymer diminishes performance properties in the polyurethane and polyurethane/urea elastomers because it reduces the quantity of chain extender that can be reacted with the prepolymer to produce elastomer hard segment. Although the actual percentage difference between theoretical stoichiometric isocyanate content in prior art systems and actual isocyanate content in prior art systems appears to be small, that difference is substantial because of isocyanate content, sequencing in the prepolymer, etc. in terms of the overall properties imparted to the urethane elastomer.

Ideally in the preparation of a prepolymer for a polyurethane or a polyurethane/urea system of this invention the actual isocyanate content should be at least 80%, and preferably at least 90% of the stoichiometric level of isocyanate for a prepolymer having a 2:1 mole ratio of cyclohexanediisocyanate to polyol. Levels of reacted cyclohexanediisocyanate below about 90%, and particularly below about 80% of stoichiometric, are direct evidence of cyclohexanediisocyanate by-product formation and/or oligomer formation. Stated another way, the resulting urethane linked prepolymer formed contains at least 80% and preferably at least 90% by weight of a prepolymer having 2 moles cyclohexanediisocyanate per mole of long chain diol.

Temperature also is an important parameter in minimizing oligomer formation in the prepolymer. Typically, as temperature is increased, one must increase the mole ratio of cyclohexanediisocyanate to polyol. As one approaches the lower end of the mole ratio range of cyclohexanediisocyanate to polyol, one may experience higher concentrations of oligomer in the prepolymer and subsequently experience decreased properties in the resulting elastomers. It is preferred that the mole ratio of cyclohexanediisocyanate to diol is from 10 to 16:1 with the reaction being concluded at temperatures from 70°–95° C. at reaction times have about 1–100 hours, typically 2–4 hours.

Although temperature control has been described as an important parameter in the reaction phase it must be recognized temperature control is also important in the recovery phase. During removal of unreacted cyclohexanediisocyanate from the urethane-linked prepolymer the temperature should be maintained as low as possible to avoid reaction of the free cyclohexanediisocyanate with the prepolymer. Substantial oligomeric allophanate formation can occur during this removal phase. For this reason if distillation techniques are used to remove free cyclohexanediisocyanate, a wiped film distillation technique should be considered in order to avoid oligomerization during prepolymer purification Other techniques which may be considered for low temperature removal of cyclohexanediisocyanate include solvent extraction using hydrocarbon solvents such as hexane as the solvent.

After prepolymer formation, unreacted cyclohexanediisocyanate is removed from the prepolymer to produce a monomer-free cyclohexanediisocyanate content <0.15% and preferably less than 0.1% by weight. Higher quantities of unreacted cyclohexanediisocyanate tend to cause handling problems due to toxicity, not to mention other handling problems associated with viscosity.

Elastomer formulation is carried out in conventional manner. For example, a catalyst may be used to enhance cure of the polyurethane formulation and catalysts include mono and dicarboxcylic acids and their metal salts as well as tertiary amines. Examples of catalysts commonly used include glutaric acid, propionic acid, and triethylenediamine and N-ethylmorpholine. Optionally, a metal promoter such as dibutyl tin dilaurate may be used. Other additives may be added and such addition is within the skill of the art.

The following examples are provided to illustrate embodiments of the invention and are not intended to restrict the scope thereof.

EXAMPLE 1

CHDI Monomer-free Urethane-Linked Prepolymers

A polyurethane prepolymer was prepared in essentially conventional manner except for the mole ratio (14:1) of cyclohexanediisocyanate to diol used. More specifically, 1659.7 grams (10.0 moles) undistilled trans-1,4-cyclohexanediisocyanate (CHDI) from AKZO N.V. were charged into a 5 liter jacketed reaction kettle equipped with a mechanical stirrer, thermocouple, $N_2$ purge, dropping funnel, and a condenser connected to a caustic scrubber. The reactor was heated to 71° C. to melt the CHDI. 704.8 grams (0.7 mmoles) 1000 $M_n$ (OH# 110.5) polytetramethyleneoxide diol (Terathane 1000 sold by duPont) was added drop wise through the addition funnel over 2.3 hours. The reaction temperature was held at 71° C. After addition was complete, the clear liquid was mixed for an additional 3.5 hours.

The unreacted CHDI was subsequently removed from the reaction mixture using a thin film still operating under the following conditions:

| | |
|---|---|
| Vacuum | 2.0–5.0 mm Hg |
| Temperature | 105–120° C. |
| Feed Rate | 60–120 g/hr |

The final product was a hazy viscous liquid at room temperature. The analysis showed the following:

| | |
|---|---|
| Unreacted CHDI by LC | <0.05% (detection limit) |
| % NCO | 5.69% |
| Theoretical % NCO | |
| 2:1 Adduct calculated minimum | 6.23% |
| 2:1 adduct content* by weight | 81% |

*calculated from % NCO and % free isocyanate assuming all oligomer is 3:2

EXAMPLE 2

CHDI Monomer-Free Urethane-Linked Prepolymer

A prepolymer was prepared according to Example 1 with 1497 grams (9.0 moles) freshly distilled CHDI and 623 grams (0.6 moles) 1000 $M_n$ (OH# 110.5) polytetramethyleneoxide diol (Terathane 1000). The final product was a water-white viscous liquid at room temperature thus showing the benefit of freshly distilled CHDI vis-a-vis Example 1.

| | |
|---|---|
| Unreacted CHDI by LC | <0.02% (detection limit |
| % NCO | 6.04 |
| Calculated minimum 2:1 adduct content | 94% |

EXAMPLE 3

CHDI Monomer-Free Urethane-Linked Prepolymers

A prepolymer was prepared according to Example 1 with 1960 grams (11.8 moles) freshly distilled CHDI and 543 grams (0.8 moles) 650 $M_n$ (OH# 166.5) polytetramethyleneoxide diol (Terathane ™ 650 sold by duPont).

| Unreacted CHDI by LC | <0.02% (detection limit) |
|---|---|
| % NCO | 8.01% |
| Theoretical % NCO for 2:1 adduct | 8.3% |
| Calculated minimum 2:1 adduct content by weight | 91% |

EXAMPLE 4

Prior Art Prepolymer Preparation

The procedure of Example 1 was essentially repeated except the mole ratio of cyclohexanediisocyanate to diol was 2:1. 307.0 grams (1.8 moles) CHDI was added to the 2 liter reaction flask equipped with a heating mantel, mechanical stirrer, $N_2$ purge, and addition funnel.

937.8 grams (0.9 moles) 1000 $M_n$ (OH# 110.5) polytetramethyleneoxide diol (Terathane 1000 duPont) was added to flask. The contents were heated to 80° C. for two hours. The temperature was then raised to 100° C. and held for 8 hours. The final product was a hazy solid at room temperature.

| Unreacted CHDI by LC | 5.8% |
|---|---|
| % NCO | 6.11% |
| Calculated minimum 2:1 adduct content by weight | 16% |

This example shows extensive oligomer formation as contrasted to the Example 1 CHDI free urethane-linked prepolymer.

EXAMPLE 5

Prior Art Prepolymer Preparation

A prepolymer was prepared according to Example 4 with 481.1 grams (2.9 moles) freshly distilled CHDI and 977.4 grams (1,4 moles) 650 $M_n$ OH#166.5) polytetramethyleneoxide diol (Terathane 650).

| Unreacted CHDI by LC | 11.1% |
|---|---|
| % NCO | 8.22% |
| Calculated minimum 2:1 adduct content | 0 (3:2 assumption fails) |

This example shows extensive higher oligomer formation (>3:2) in contrast to Example 3.

EXAMPLE 6

Viscosity Analysis

Viscosity measurements of the prepolymers of Examples 2, 3, 4, and 5 were obtained using a Brookfield RVT viscometer equipped with a Thermosell unit. Measurements were carried out at 20 rpm with a #27 spindle (calculated shear rate of 6.8 $sec^{-1}$). The prepolymers prepared according to this invention are of significantly lower viscosity at temperatures from 25°–80° C.

| | | Viscosity (cps) | |
|---|---|---|---|
| Example | Polyol | 40° C. | 80° C. |
| 2 | T-1000 | 6450 | 2200 |
| 4 | T-1000 | solid | 3120 |
| 3 | T-650 | 4200 | 1080 |
| 5 | T-650 | solid | 7700 |

The results show the CHDI-free urethane-linked prepolymers of Examples 2 and 3 are liquid whereas the prior art prepolymers of Example and 5 are solid at room temperature.

Example 7

Preparation and Properties of Polyurethane Elastomers

In this example several polyurethane elastomers were formed in conventional manner. More specifically, 63.07 parts of the Example 1 prepolymer and 7.43 parts diethyltoluenediamine (80% 2,4- and 20% 2,6-) were degassed and heated to 70° C.

The two components were then mixed together and poured into a 6×6×⅛" mold which had been preheated to 110° C. The mold was then closed and pressed at 1400 lbs at 110° C. for 1 hour. The elastomer was post cured at 110 C for 16 hours. (Run 1)

Using the procedure outlined above. additional elastomers were prepared from the following components including Run 1 and are identified as Runs 2-12 below.

| Run | Polyisocyanate | Chain Extender | Catalyst |
|---|---|---|---|
| 1 | 63.07 parts Ex. 1 | 7.43 parts DETDA | |
| 2 | 67.43 parts Ex. 1 | 6.27 parts CHDM | 0.004 parts T-9 |
| 3 | 66.41 parts Ex. 2 | 8.10 parts tBTDA | |
| 4 | 64.62 parts Ex. 1 | 12.94 parts DtBMDA | |
| 5 | 65.65 parts Ex. 4 | 8.10 parts DETDA | |
| 6 | 65.65 parts Ex. 4 | 6.56 parts CHDM | 0.004 parts T-9 |
| 7 | 65.65 parts Ex. 4 | 8.10 parts tBTDA | |
| 8 | 60.18 parts Ex. 4 | 12.94 parts DtBMDA | |
| 9 | 61.16 parts Ex. 3 | 9.90 parts DETDA | |
| 10 | 61.16 parts Ex. 3 | 9.90 parts tBTDA | |
| 11 | 59.64 parts Ex. 5 | 9.90 parts DETDA | |
| 12 | 59.64 parts Ex. 5 | 9.90 parts tBTDA | |

Elastomer physical properties were obtained using the following ASTM test methods. The tests were performed at ambient and 121° C.

| Tensile Strength (micro) | ASTM D-412-83 |
|---|---|
| Percent Elongation | ASTM D-412-83 |
| Tear Strength (Die C) | ASTM D-624-81 |
| Hardness | ASTM D-2240-79 |

From the above:
DETDA represents diethylenetoluenediamine consisting of 80% of 3,5-diethyl-2,4-toluenediamine and 20% of 3,5-diethyl-2,6-toluenediamine.
CHDM refers to methylene-bis(cyclohexylamine)
TBTDA refers to tertiary-butyl toluenediamine consisting of 80% 5-tert-butyl-2,4-toluenediamine and 20% of 3-tert-butyl-2,6-toluenediamine.
DtBMDA refers to 3,3 -ditertiarybutylmethylenedianiline.
T-9 is a commercial tin catalyst, i.e., stannous octoate.

| MONOMER-FREE CHDI PREPOLYMERS | | | | | | | | |
|---|---|---|---|---|---|---|---|---|
| | Run 1 | | Run 2 | | Run 3 | | Run 4 | |
| Polyol | T-1000 | | T-1000 | | T-1000 | | T-1000 | |
| Chain Extender | DETDA | | CHDM | | tBTDA | | DtBMDA | |
| % Chain Extender | 10.5 | | 8.51 | | 10.9 | | 16.7 | |
| % Hard Segment | 31.9 | | 30.4 | | 32.5 | | 36.6 | |
| Shore A/D | 95/45 | | 95/49 | | 96/54 | | 96/56 | |
| Temperature °(C.) | 25 | 121 | 25 | 121 | 25 | 121 | 25 | 121 |
| 100% Tensile (psi) | 1850 | 1420 | 2110 | 1380 | 2530 | — | 3300 | 2160 |
| 200% Tensile (psi) | 2020 | 1450 | 2400 | 1520 | 3320 | — | 4700 | 2840 |
| 300% Tensile (psi) | 2290 | 1560 | 2860 | 1840 | — | — | — | — |
| Break Tensile (psi) | 2520 | 1570 | 3850 | 2250 | 4330 | 1770 | 5170 | 3220 |
| % Elongation (psi) | 390 | 320 | 490 | 430 | 280 | 50 | 230 | 240 |
| Die C Tear (pli) | 400 | 310 | 690 | 330 | 480 | 420 | 610 | na |

| PRIOR ART PREPOLYMERS | | | | | | | | |
|---|---|---|---|---|---|---|---|---|
| | Run 5 | | Run 6 | | Run 7 | | Run 8 | |
| Polyol | T-1000 | | T-1000 | | T-1000 | | T-1000 | |
| Chain Extender | DETDA | | CHDM | | tBTDA | | DtBMDA | |
| % Chain Extender | 11.0 | | 9.08 | | 11.0 | | 17.7 | |
| % Hard Segment | 33.4 | | 32.0 | | 33.4 | | 38.5 | |
| Shore A/D | 93/43 | | 94/48 | | 92/44 | | 96/56 | |
| Temperature °(C.) | 25 | 121 | 25 | 121 | 25 | 121 | 25 | 121 |
| 100% Tensile (psi) | 1650 | 960 | 1710 | 1110 | 1570 | 750 | 2530 | 1510 |
| 200% Tensile (psi) | 2350 | 1220 | 2020 | 1240 | 2320 | 1030 | 3720 | 1920 |
| 300% Tensile (psi) | 3300 | — | 2470 | 1520 | 3480 | 1510 | 5270 | — |
| Break Tensile (psi) | 4310 | 1480 | 4350 | 2740 | 4910 | 1860 | 5390 | 2390 |
| % Elongation | 400 | 270 | 690 | 730 | 400 | 360 | 320 | 280 |
| Die C Tear (pli) | 540 | 280 | 730 | 400 | 550 | 270 | 580 | 270 |

| MONOMER-FREE CHDI PREPOLYMERS | | | | |
|---|---|---|---|---|
| | Run 9 | | Run 10 | |
| Polyol | T-650 | | T-650 | |
| Chain Extender | DETDA | | tBTDA | |
| % Chain Extender | 13.9 | | 13.9 | |
| % Hard Segment | 41.8 | | 41.8 | |
| Shore A/D | 97/65 | | 97/67 | |
| Temperature °(C.) | 25 | 121 | 25 | 121 |
| 100% Tensile (psi) | 3710 | 2280 | 4370 | 2510 |
| 200% Tensile (psi) | 4330 | 2500 | 5620 | 2970 |
| 300% Tensile (psi) | — | — | — | — |
| Break Tensile (psi) | 4320 | 2760 | 6630 | 4060 |
| % Elongation (psi) | 210 | 280 | 270 | 310 |
| Die C Tear (pli) | 690 | 550 | 810 | 550 |

| PRIOR ART PREPOLYMERS | | | | |
|---|---|---|---|---|
| | Run 11 | | Run 12 | |
| Polyol | T-650 | | T-650 | |
| Chain Extender | DETDA | | tBTDA | |
| % Chain Extender | 13.9 | | 13.9 | |
| % Hard Segment | 42.5 | | 42.5 | |
| Shore A/D | 96/56 | | 97/62 | |
| Temperature °(C.) | 25 | 121 | 25 | 121 |
| 100% Tensile (psi) | 2760 | 1740 | 2990 | 1670 |
| 200% Tensile (psi) | 3890 | 2160 | 4350 | 2140 |
| 300% Tensile (psi) | 5050 | — | 5960 | 3020 |
| Break Tensile (psi) | 5790 | 2690 | 7160 | 4760 |
| % Elongation (psi) | 380 | 290 | 380 | 460 |
| Die C Tear (pli) | 660 | 450 | 670 | 430 |

The elastomers prepared with the CHDI monomer-free prepolymer (Runs 1-4 and Runs 9 and 10) are harder and have a higher 100% tensile than the conventional prepolymer elastomers (Runs 5-8 and Runs 11 and 12) despite the fact that the conventional elastomers have a higher hard segment content. In the runs (3 and 7) where the hard segment content is most similar (0.325 vs. 0.334), because distilled CHDI was used to generate about 94% 2:1 adduct (Example 2) in contrast to 16% 2:1 adduct (Example 4), the difference in hardness and 100% tensile is more pronounced. In addition, the high temperature properties (100% tensile, break tensile, tear strength) of the elastomers extended with aromatic amines appear to be better with the monomer-free CHDI prepolymer than the conventional prior art prepolymer.

Although not intending to be bound by theory, it is believed the low level of oligomers and low level of unreacted CHDI in the monomer-free CHDI prepolymer contributes to the increased hardness and stiffness of elastomers. The monomer-free CHDI prepolymer is predominantly the 2:1 adduct and when cured produces a uniform hard segment consisting of 2 molecules CHDI reacted with 1 molecule chain extender. The more uniform hard segment results in a different morphology which is believed the cause of the increased hardness and stiffness of the elastomers even at lower hard segment contents. This factor and the absence of unreacted CHDI probably aids the high temperature performance of the aromatic amine extended elastomers. On the other hand, the higher molecular weight oligomers in the prior art prepolymers contribute to a higher viscosity while the high melting unreacted CHDI (m.p. 65° C.) contributes to the high melting point of the prepolymer.

Example 8

Dynamic Mechanical Analysis

Figure 2:
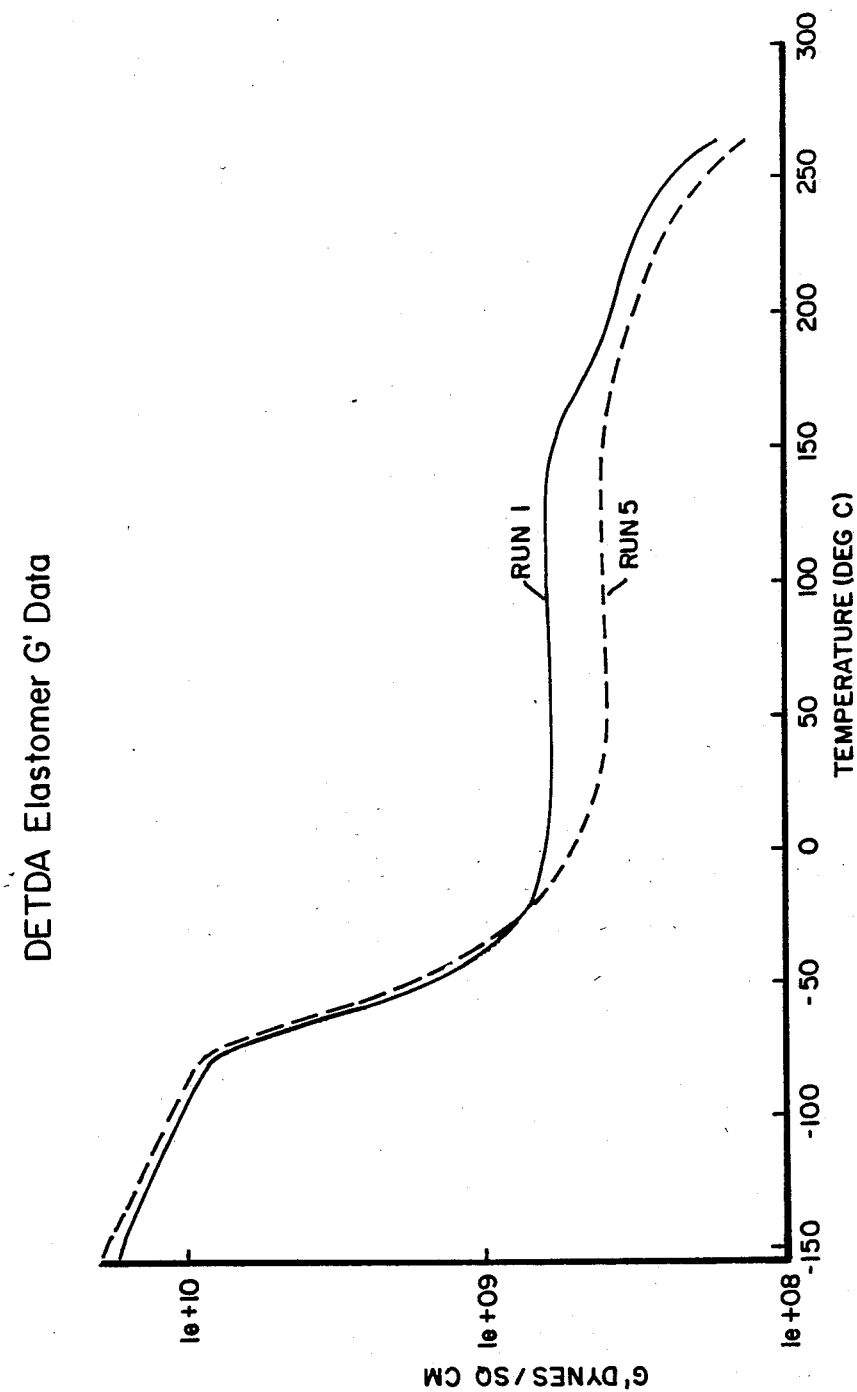

Dynamic mechanical spectra were obtained for the elastomers of Runs 1, 2, 5 and 6 of Example 7 using a Rheometrics RMS-605 Mechanical Spectrometer operating in torsional/rectangular mode at 6.28 rad/sec. Temperature sweeps were employed from −150° to 250° C. Plots of the shear storage modulus (G') vs. temperature are shown in FIGS. 1,2. In the case of both the aliphatic diol (CHDM) and the aromatic amine (DETDA) chain extended elastomers, the monomer-free CHDI prepolymer of Example 1 has a higher shear storage modulus than the corresponding conventional CHDI prepolymer (Ex. 3) despite the higher hard segment content of the latter.

What is claimed is:

1. In a process for producing a prepolymer suited for producing a polyurethane or polyurethane/urea elastomer wherein an aliphatic diisocyanate selected from the group consisting of cyclohexanediisocyanate or $C_{1-4}$ alkyl-substituted cyclohexanediisocyanates is reacted with a long chain diol to produce a prepolymer and the prepolymer reacted with a diol or diamine chain extender to form a said polyurethane or polyurethane/urea elastomer, the improvement for producing such prepolymer and for enhancing physical properties in the resulting polyurethane or polyurethane/urea elastomer which comprises:
   (a) reacting said aliphatic diisocyanate with said long chain diol at a temperature from about 40° to 100° C. and at a mole ratio of aliphatic diisocyanate to long chain diol from 6 to 20:1; and
   (b) removing unreacted aliphatic diisocyanate from the reaction product to a level of less than about 0.15% by weight of the prepolymer.

2. The process of claim 1, wherein the temperature is maintained from about 65° to 80° C.

3. The process of claim 1 wherein the molecular weight of said long chain diol is from 250 to 3000.

4. The process of claim 3 wherein the aliphatic diisocyanate is trans-1,4-cyclohexanediisocyanate.

5. The process of claim 4, wherein the mole ratio of trans-1,4-cyclohexanediisocyanate to long chain diol is maintained at a level from 10 to 16:1 during the reaction of said cyclohexanediisocyanate with the long chain diol and the isocyanate content in the prepolymer is at least 80 mole % of the stoichiometric quantity for a prepolymer reaction product having a prepolymer of 2 moles reacted cyclohexanediisocyanate and 1 mole long chain diol.

6. The process of claim 5 wherein the long chain diol is polytetramethylene glycol.

7. The process of claim 5 wherein the long chain diol is polypropylene glycol.

8. The process of claim 5 wherein the long chain diol is a polyester diol.

9. A prepolymer of cyclohexanediisocyanate and long chain diol containing at least 80% by weight of a prepolymer having a reacted mole ratio of cyclohexanediisocyanate to long chain diol of 2:1 and having less than about 0.15% by weight of unreacted cyclohexanediisocyanate.

10. The prepolymer of claim 9, wherein the cyclohexanediisocyanate is the trans-isomer of cyclohexane-1,4-diisocyanate.

11. The prepolymer of claim 11 wherein the diol is selected from the group consisting of polytetramethylene glycol, polypropylene glycol, and polyester diol.

12. In a polyurethane elastomer formed by the reaction of a prepolymer comprising trans-cyclohexane-1,4-diisocyanate and a long chain diol with an aromatic diamine chain extender, the improvement which comprises utilizing in said reaction a prepolymer of trans-cyclohexane-1,4-diisocyanate and long chain diol where the free isocyanate level in said prepolymer is at least 80% of the stoichiometric level based on a 2:1 mole ratio of cyclohexanediisocyanate to long chain diol and the percent unreacted trans-cyclohexane-1,4-diisocyanate is less than 0.15% by weight of said prepolymer.

* * * * *